(12) United States Patent
Ferreira et al.

(10) Patent No.: US 8,967,915 B2
(45) Date of Patent: Mar. 3, 2015

(54) GROUND STABILISING DEVICE

(75) Inventors: Andre Ferreira, South Yorkshire (GB); Neil Clarke, South Yorkshire (GB)

(73) Assignee: Gripple Limited (GB)

( * ) Notice: Subject to any disclaimer, the term of this patent is extended or adjusted under 35 U.S.C. 154(b) by 0 days.

(21) Appl. No.: 14/009,746

(22) PCT Filed: Apr. 2, 2012

(86) PCT No.: PCT/GB2012/000302
§ 371 (c)(1),
(2), (4) Date: Oct. 3, 2013

(87) PCT Pub. No.: WO2012/140393
PCT Pub. Date: Oct. 18, 2012

(65) Prior Publication Data
US 2014/0037387 A1 Feb. 6, 2014

(30) Foreign Application Priority Data

Apr. 12, 2011 (GB) .................................. 1106118.1
Mar. 29, 2012 (GB) .................................. 1205518.2

(51) Int. Cl.
*E02D 5/80* (2006.01)
*F16G 11/10* (2006.01)
(52) U.S. Cl.
CPC ................ *E02D 5/80* (2013.01); *F16G 11/108* (2013.01)
USPC .................................... 405/259.1; 405/259.4

(58) Field of Classification Search
USPC .......... 405/259.1, 258.1, 259.4, 259.5, 302.4, 405/302.6; 52/166
See application file for complete search history.

(56) References Cited

U.S. PATENT DOCUMENTS

| | | | |
|---|---|---|---|
| 4,216,568 A | | 8/1980 | Anderson |
| 4,371,293 A | * | 2/1983 | Wilcox et al. .............. 405/302.1 |
| 5,026,213 A | | 6/1991 | Habib et al. |
| 7,534,073 B2 | | 5/2009 | Stahm |
| 2008/0034682 A1 | | 2/2008 | Carpenter |
| 2009/0003940 A1 | * | 1/2009 | Oldsen et al. .................. 405/288 |
| 2010/0279540 A1 | * | 11/2010 | Shawcross et al. ........... 439/488 |

FOREIGN PATENT DOCUMENTS

| | | |
|---|---|---|
| DE | 198 35 976 | 2/2000 |
| JP | 07-233529 | 9/1995 |
| JP | 11-315700 | 11/1999 |
| JP | 2003-147774 | 5/2003 |
| JP | 2003-314199 | 11/2003 |
| KR | 10-0718205 | 5/2007 |
| KR | 10-2011-0021293 | 3/2011 |

* cited by examiner

*Primary Examiner* — Sean Andrish
(74) *Attorney, Agent, or Firm* — Clark Hill PLC

(57) ABSTRACT

A ground stabilizing device (10) comprises a securing arrangement (16) and a load spreading arrangement (18) on the securing arrangement. The securing arrangement defines a through passage (40) for an elongate article (12). The securing arrangement comprises a guide member (54) extending towards the passage, and a clamping assembly (38). The clamping assembly is movable along the guide member towards the passage to clamp the elongate article in the passage and secure the elongate article to the ground stabilizing device.

20 Claims, 7 Drawing Sheets

GROUND STABILISING DEVICE

RELATED/PRIORITY APPLICATION

This application is a National Phase filing regarding International Application No. PCT/GB2012/00302, filed on Apr. 2, 2012, which relies upon Great Britain Application Nos. 1106118.1 and 1205518.2, filed on Apr. 12, 2011 and Mar. 29, 2012, respectively, for priority.

BACKGROUND OF THE INVENTION

This invention relates to ground stabilising devices. More particularly, but not exclusively, this invention relates to ground stabilising devices for use with wires, wire ropes, strands or cables.

In order to stabilise unsteady ground, anchors attached to wires or cables are driven into the ground to a depth at which they are securely held. A ground stabilising device mounted on the opposite end of the wire is then moved along the wire until it is tightened against the ground. The ground stabilising device can include a suitable clamp to allow it to be held in place on the wire.

BRIEF SUMMARY OF THE INVENTION

According to one aspect of this invention, there is provided a ground stabilising device comprising a securing arrangement and a load spreading arrangement on the securing arrangement, wherein the securing arrangement defines a through passage for an elongate article, and a channel in communication with the through passage, and the securing arrangement comprises a clamping assembly in the channel, the clamping assembly being movable along the channel towards the through passage to clamp the elongate article in the through passage and secure the elongate article to the ground stabilising device.

According to another aspect of this invention, there is provided a ground stabilising device comprising a securing arrangement and a load spreading arrangement on the securing arrangement, wherein the securing arrangement defines a through passage for an elongate article, a guide member extending towards the through passage, and the securing arrangement comprises a clamping assembly, the clamping assembly being movable along the guide member towards the through passage to clamp the elongate article in the through passage and secure the elongate article to the ground stabilising device.

The securing arrangement may define a space in communication with the through passage. The guide member may extend along the space. The guide member may constitute a wall of the space. The space may be a channel. The guide member may be inclined relative to the through passage. The channel may be inclined relative to the through passage.

The clamping assembly may comprise a clamping member. The clamping assembly may further include urging means to urge the clamping member towards the through passage. The clamping assembly may be movable along the channel.

The clamping member may be a cylindrical or spherical member, or a wedge. The urging means may comprise a spring, such as a compression spring.

The securing arrangement may comprise a body which may extend transverse to the load spreading arrangement. The channel may be defined by the body. The channel may be inclined at an acute angle to the through passage, such as between 10° and 30°. In one embodiment, the clamping member is separate from the body. The clamping member may be movable linearly relative to the body.

The guide member may have a first end region proximate or at the through passage. The guide member may have a second end region spaced from the first end region. The urging means may extend from the second end region towards the first end region. The clamping member may be disposed at the first end region.

The channel may have an open first end region to provide communication between the channel and the through passage. The channel may have a second end region spaced from the first end region. The urging means may extend from the second end region towards the first end region. The clamping member may be disposed at the first end region. The first end region of the guide member may be provided at the open first end region of the channel. The second end region of the guide member may be provided at the second end region of the channel.

A reaction member may be provided at the second end region to provide a reaction force to the urging member. The second end region may be a blind end region of the channel. The second end region may constitute the reaction member.

The securing arrangement may comprise release means to release the clamping member from clamping the elongate article. The release means may comprise a release aperture extending through the body to the first end of the channel. The release aperture may be provided in the body adjacent to the first end region of the channel.

The through passage may be defined by the body. The through passage may extend along an article engaging wall, which may be provided by the body. The clamping member may be urged by the urging means towards the article engaging wall. The clamping member may be configured to clamp the elongate article against the article engaging wall.

The load spreading arrangement may extend outwardly from the securing arrangement. The load spreading arrangement may extend radially outwardly from the body. The load spreading arrangement may be generally circular or oval in plan. In another embodiment, the load spreading arrangement may be generally polygonal in plan, such as a square or rectangle.

The load spreading arrangement may comprise a plurality of outwardly extending elongate rib members. The outwardly extending elongate members may have distal ends spaced from the securing arrangement. In one embodiment, the load spreading arrangement may comprise a rim to join the distal ends of adjacent outwardly extending elongate rib members to each other. The rim may extend substantially wholly around the securing arrangement. In another embodiment, the distal ends of the outwardly extending elongate rib members may be free ends, and may be unattached to a rim.

The load spreading arrangement may include a web covering, which may extend between the elongate rib members. The web covering may extend across the rib members.

In a further embodiment, the load spreading arrangement may have a holding formation in which an end region of the elongate article can be held. The holding formation may extend outwardly from the securing arrangement.

The load spreading arrangement may comprise a web covering, and the holding formation may be defined in the web covering. The holding formation may be elongate, and may be a recess defined in the web covering. The holding formation may be curved.

The load spreading arrangement may have two holding formations extending opposite each other from the securing arrangement. Each holding formation may extend outwardly from the securing arrangement.

The, or each, holding formation may be a groove defined in the web covering.

According to another aspect of this invention, there is provided a ground stabilising assembly comprising a ground stabilising device as described above and an elongate article.

The elongate article may be formed of a metal such as steel, and may comprise a wire, wire rope, strand or cable.

BRIEF DESCRIPTION OF SEVERAL VIEWS OF THE DRAWINGS

Embodiments of the invention will now be described by way of example only, with reference to the accompanying drawings, in which.

DETAILED DESCRIPTION OF THE INVENTION

Figure 1:
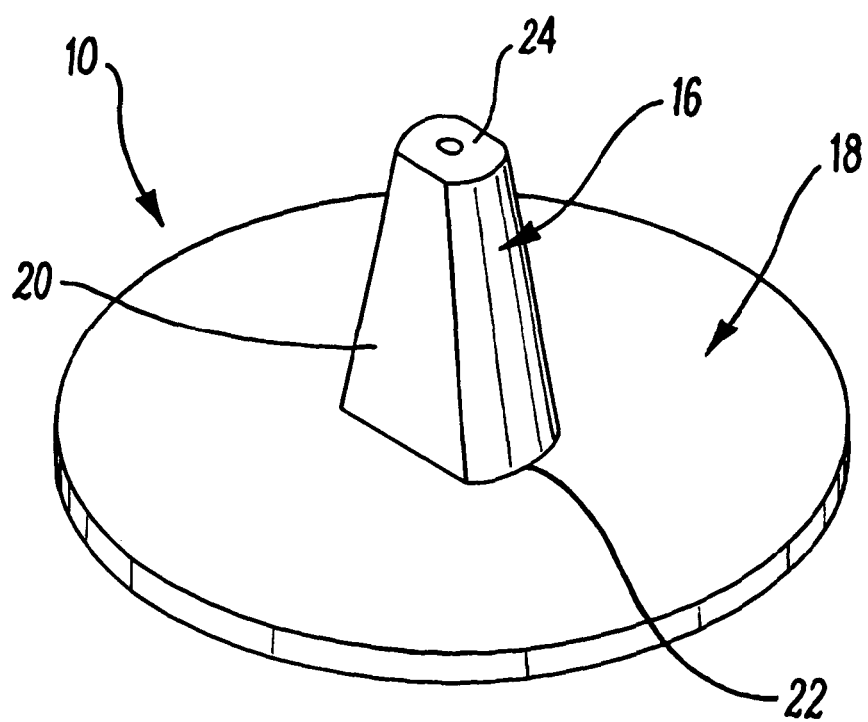
FIG. 1 is a bottom perspective view of a ground stabilising device.
Figure 5:
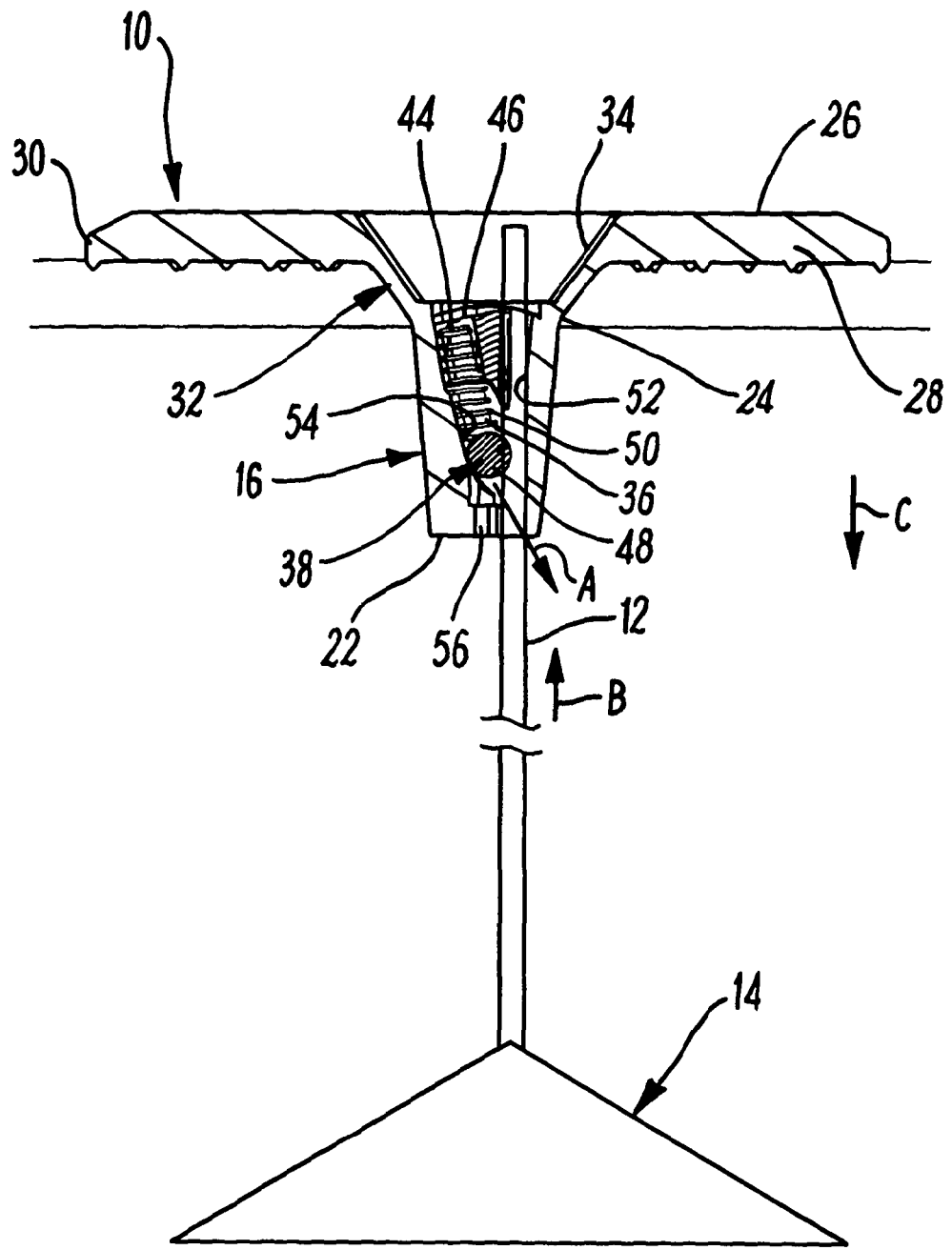
FIG. 5 is a diagrammatic sectional side view of the ground stabilising device shown in FIGS. 2 and 3 in use.

FIG. 1 shows a ground stabilising device 10 which is used in conjunction with a flexible elongate article 12, such as a wire, wire rope or strand, and a ground anchor 14 (see FIG. 5). A suitable ground anchor is disclosed in Patent Specification Number U.S. Pat. No. 7,534,073. The function of the ground stabilising device 10 is to stabilise the ground or soil in areas where the ground or soil may be unstable. The ground stabilising device 10 can be used with a mat that is disposed over the ground to be stabilised.

The ground stabilising device 10 comprises a securing arrangement 16 and a load spreading arrangement 18 which extends outwardly from the securing arrangement 16. In the embodiment shown in FIG. 1, the load spreading arrangement 18 extends radially outwardly from the securing arrangement 16 and is generally in the form of a circular disc. It will be appreciated, however, that the load spreading arrangement 18 can be of any other suitable shape, and examples of different load spreading arrangements are described below.

The securing arrangement 16 comprises a body 20 having a first end 22 and a second end 24. The second end 22 of the body 20 is attached directly to the load spreading arrangement 18, and the second end 24 is spaced therefrom. The body 20 houses a clamping assembly which is described in more detail below.

Figure 2:
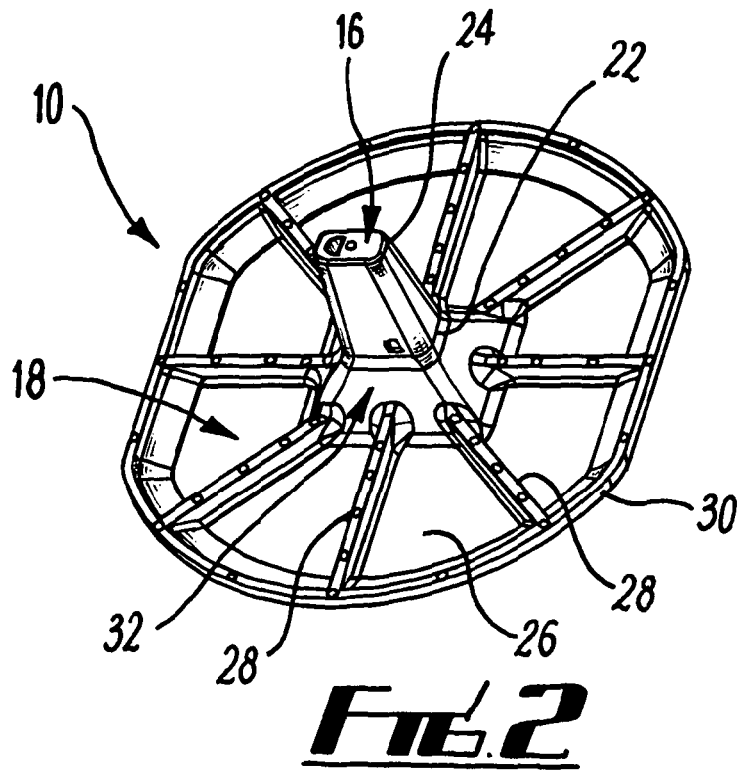
FIG. 2 is a bottom perspective view of a further embodiment of a ground stabilising device.
Figure 3:
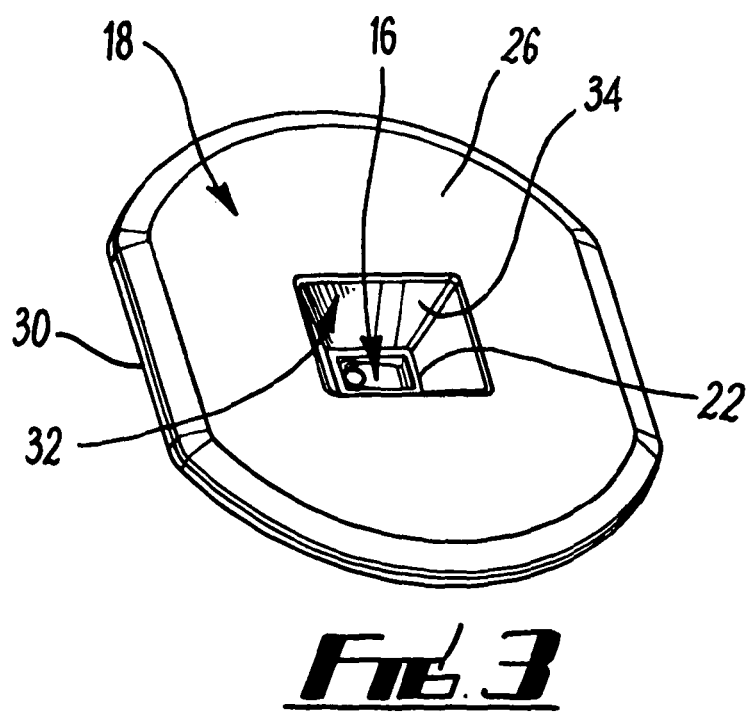
FIG. 3 is a top perspective view of the ground stabilising device shown in FIG. 2.

Referring to FIGS. 2 and 3, there is shown a second embodiment of the ground stabilising device 10 in which the load spreading arrangement 18 is of an oval shape in plan, and comprises a web covering 26, radially outwardly extending rib members 28 and a downwardly extending rim 30. The web covering 26 extends between, and across, the rib members 28.

The securing arrangement 16 shown in FIGS. 2 and 3 further include a recessed member 32. The body 20 is attached at its lower end to a recessed member 32, which extends between the load spreading arrangement 18 and the body 20. The web covering 26 and the rib members 28 extend from the recessed member 32 to the rim 30.

As seen in FIG. 3, the recessed member 32 defines a recess 34, which is provided to hold a cut end of the elongate article 12. When the ground stabilising device 10 has been installed and secured to the elongate article 12, as explained below, a length of the elongate article 12 extends upwardly from the ground stabilising device 10. The elongate article 12 can then be cut. In order to prevent dangerous short lengths of the elongate article 12 extending from the ground stabilising device 10, the region of the elongate article 12 within the recess 34 can be cut below the upper surface of the load spreading arrangement 18 so that the cut upper end region of the elongate article 12 is held within the recess 32, and does not extend above the upper surface of the load spreading arrangement 18.

Figure 4:
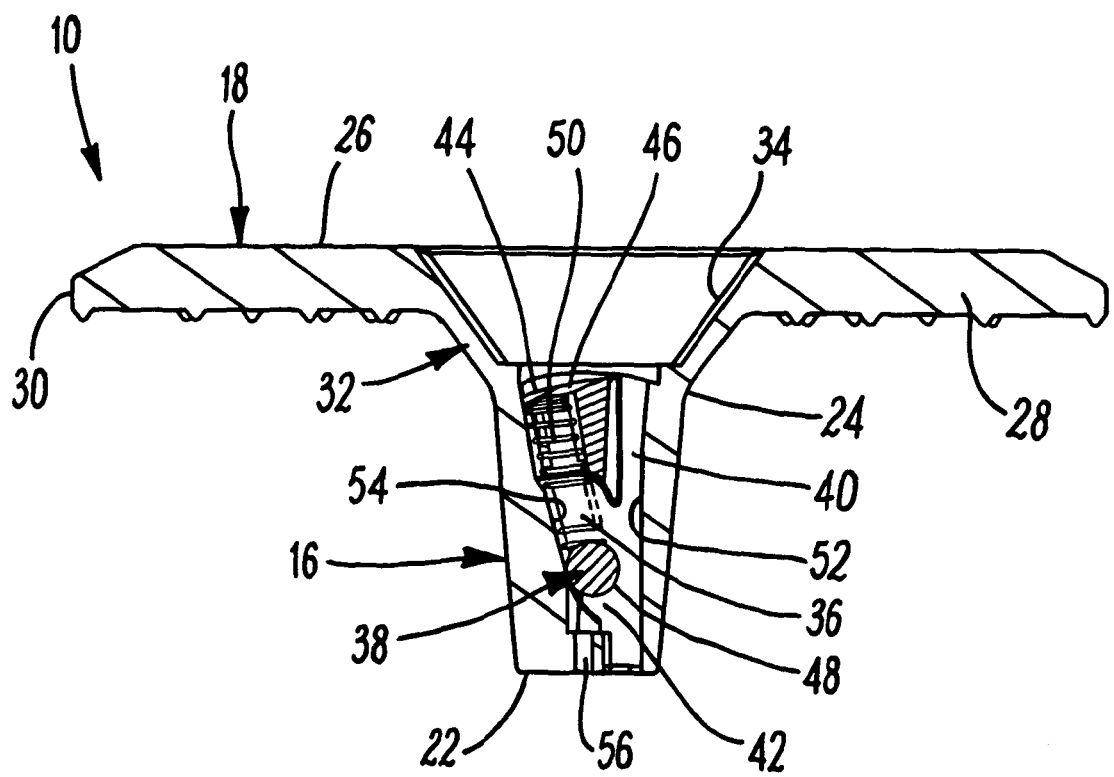
FIG. 4 is a sectional side view of a ground stabilising device.

Referring to FIG. 4, there is shown a sectional side view of the ground stabilising device 10 shown in FIGS. 2 and 3. In FIG. 4, the securing arrangement 16 is shown in more detail. The securing arrangement 16 comprises a space in the form of a channel 36 defined in the body 20 in which a clamping assembly 38 is held. The body 20 also defines a through passage 40 for the elongate article 12.

The channel 36 has a distal end 42, which provides communication between the channel 36 and the through passage 40. The channel 36 also includes a proximal end region 44, which is a blind end. An abutment member 46 is arranged across the proximal end region 44.

The clamping assembly 38 comprises a clamping member 48 and urging means in the form of a coiled compression spring 50. As shown in FIG. 5, the clamping member 48 is urged by the compression spring 50 in the direction indicated by the arrow A towards the through passage 40. The compression spring 50 extends between the abutment 46 and the clamping member 48, the abutment 46 providing a reaction force against the compression spring, to enable the compression spring 50 to urge the clamping member 48 in the direction of the arrow A.

In the embodiment shown herein, the clamping member is in the form of a cylinder, but it will be appreciated that the clamping member 48 could be any other suitable shape, for example a sphere or a wedge.

The through passage 40 is defined between the channel 36 and an article engaging wall 52 of the body 20. The channel 36 is defined between an inclined guide member, in the form of an inclined guide wall 54, and the through passage 40. The inclined guide wall 54 is inclined to the through passage 40 at an angle of between 10° and 30°. Thus, the wedge is urged towards the elongate article 12 at an acute angle thereto.

The through passage 40 is provided to receive therethrough the elongate article 12, as shown in FIG. 5. When the elongate article 12 is received therein, and before the clamping member 48 has been tightened against the elongate article 12, as explained below, the elongate article 12 can be moved through the through passage in the direction indicated by the arrow B.

When it is desired to clamp the elongate article 12 to the ground stabilising device 10, the ground stabilising device 10 is moved along the elongate article 12 in the direction indicated by the arrow C. The compression spring 50 holds the clamping member 48 in engagement with the elongate article 12, so that movement of the elongate article 12 in the direction of the arrow C causes the clamping member 48 to move along the inclined guide wall 54 in the direction indicated by the arrow A and is thus urged against the elongate article 12, by a combination of the action of the spring 50 and the inclination of the guide wall 54 until the elongate article 12 is clamped tightly by the clamping member which pushes the elongate article 12 against the article engaging wall 52.

In order to release the clamping member from the clamping device, a release aperture 56 is defined in the body 20 and extends inwardly from the distal end 24 to the channel 36. The release aperture 56 thereby provides communication between the first end 42 of the channel 36 and the region outside the body 20 at the distal end 24.

A suitable release tool (not shown) which comprises an elongate insertion member can be inserted through the release aperture 56 into engagement with the clamping member 38. By applying a force against the clamping member in the direction opposite to the direction indicated by the arrow A, the clamping member 38 can be released from the elongate article 12, thereby allowing the position of the ground stabilising device 10 to be adjusted along the elongate article 12.

Figure 6:
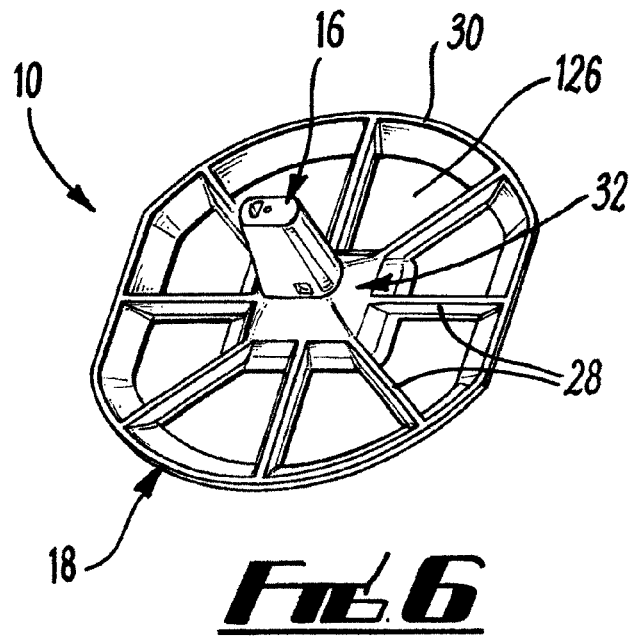
FIG. 6 is a bottom perspective view of a further embodiment of a ground stabilising device.
Figure 7:
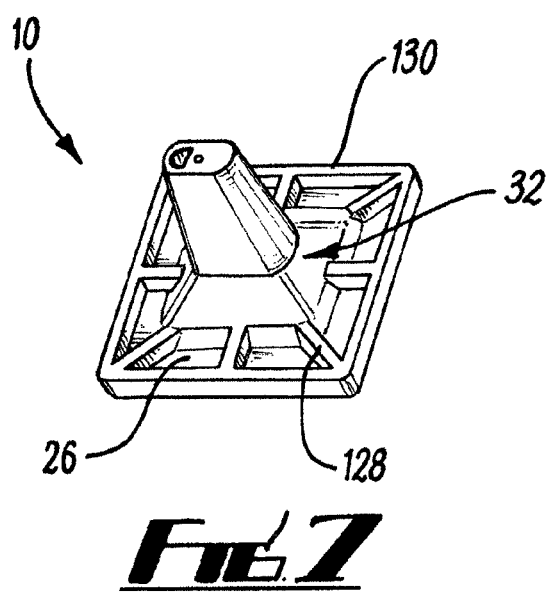
FIG. 7 is a bottom perspective view of a fourth embodiment of a ground stabilising device.
Figure 8:
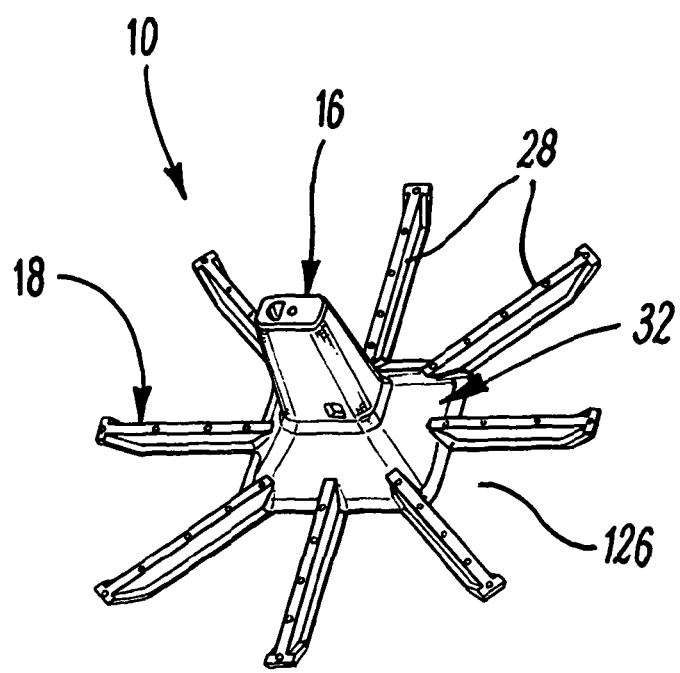
FIG. 8 is a bottom perspective view of a fifth embodiment of a ground stabilising device.

Further embodiments of the ground stabilising device 10 are shown in FIGS. 6, 7 and 8. Each of the embodiments shown in FIGS. 6, 7 and 8 comprises a securing arrangement as described above, but different load spreading arrangements. In FIG. 6, the load spreading arrangement 18 is of the same general shape as the load spreading arrangement 18 shown in FIGS. 2 and 3, but the web portion of the load spreading arrangement 18 has been omitted. The load spreading arrangement 18 shown in FIG. 6 thus consists only of the rib members 28 and the rim 30. Gaps 126 are defined between the rib members 28. The load spreading arrangement 18 shown in FIG. 6 thus allows growth of grass between the rib members 28.

The ground stabilising device shown in FIG. 7 has a load spreading arrangement 18 which is of a generally square configuration comprising a square rim 130, rib members 128, and a web portion 126. The ground stabilising device 10 shown in FIG. 7 is used for the purpose of repair.

FIG. 8 shows a further embodiment which is similar to the embodiment shown in FIG. 6, but the rim 30 and the web covering 26 have been omitted, such that the load spreading arrangement 18 comprises only the rib members 28.

Figure 9:
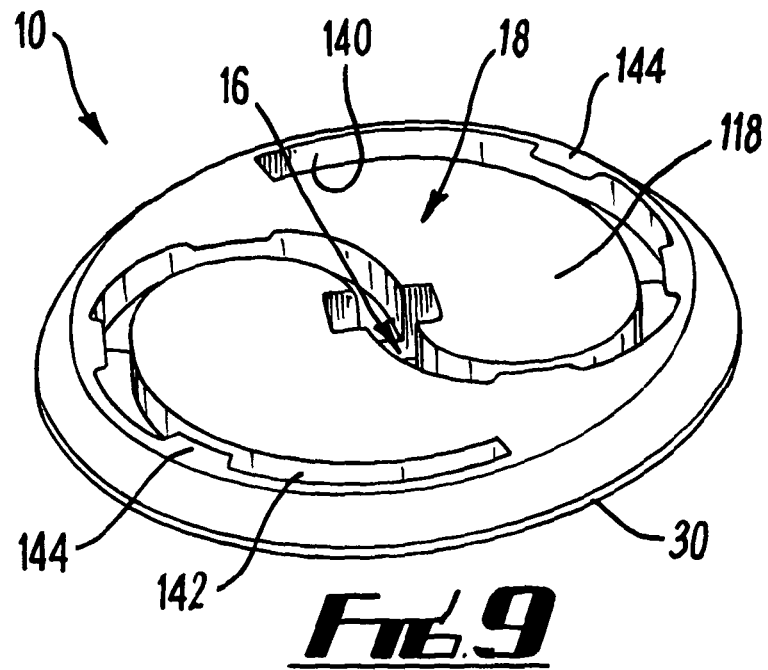
FIG. 9 is a top perspective view of a sixth embodiment of a ground stabilising device.
Figure 10:
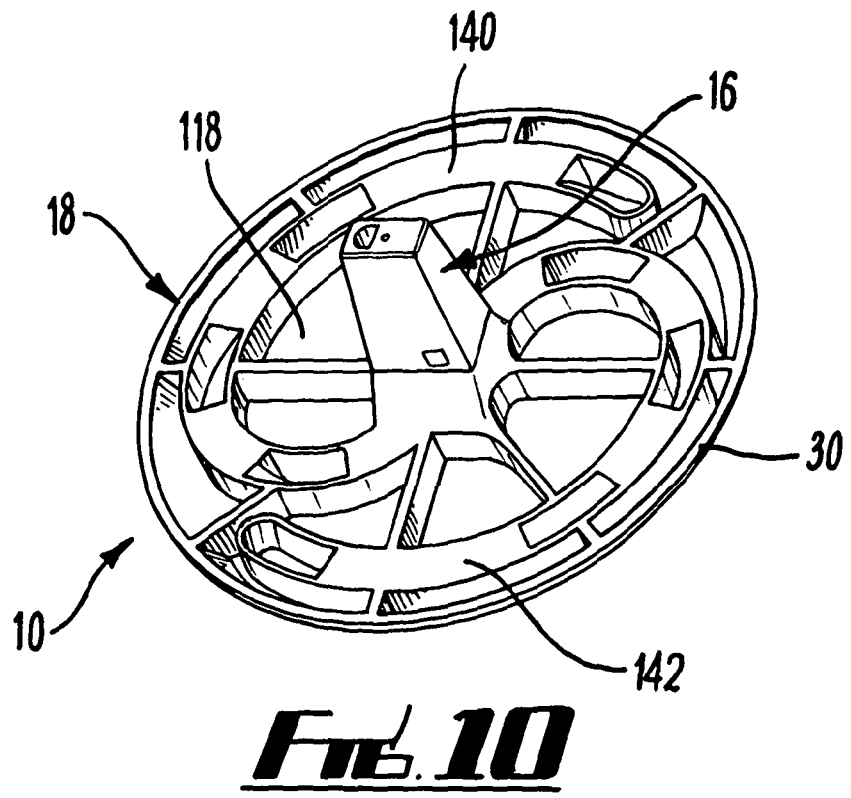
FIG. 10 is a bottom perspective view of the ground stabilising device shown in FIG. 9.

FIGS. 9 and 10 show a fifth embodiment, in which the load spreading arrangement 18 is in the form of a disc 118, which is generally circular in configuration, having a web covering 26 extending from the securing arrangement 16 to the rim 30. The rib members 28 extend radially outwardly from the securing arrangement 16.

The load spreading arrangement 18 has a holding formation in the form of a pair of elongate recesses 140, 142 defined by the web covering 26. The recesses 140, 142 extend from the securing arrangement 16 opposite each other. Each recess 140, 142 is curved, and together they provide an "S" shaped groove extending on opposite sides of the securing arrangement 16.

The recesses 140, 142 are provided to hold the end length of the elongate article 12, where said end length protrudes upwardly from the securing arrangement 16. The recesses 140, 142 have tabs 144 which hold the aforesaid protruding length of the elongate article 12 in the recess 140 or 142.

If it is desired to adjust the ground stabilising device 10 along the elongate article 12, the protruding length of the elongate article 12 can be removed from the recess 140 or 142 and the clamping member released therefrom by the use of the release tool, as described above. The ground stabilising device 10 can then be moved along the elongate article 12 to the desired position, and can then be clamped by the clamping assembly 38. Any remaining length of the elongate article 12 protruding from the securing arrangement 16 can be disposed in one of the recesses 140, 142, and held therein by the tabs 144.

There are thus described various embodiments of a load stabilising device 10 which provide several advantages over the prior art, for example, the elongate article 12 can be released to allow the ground stabilising device 10 to be adjusted to a position anywhere along the elongate article 12. A further advantage is that the recess 34 allows the cut end of the elongate article to be housed below the upper surface of the load spreading arrangement 18. A further advantage is that the load stabilising device 10 described above are provided as a single unit, thereby avoiding the need for assembly on site. Another advantage of the embodiment described above is that it has a load spreading arrangement, which can thereby preserve the integrity of a substrate, such as a mat, upon which it is used. Yet another advantage is that the ground stabilising device 10 has a low visual impact. A further advantage is that, by the use of a metal to form the ground stabilising device 10 and the elongate article 12, the mechanical properties are maintained under extreme temperatures and extreme weather conditions, and over a long period of time. The embodiments described herein also have the advantage that the elongate article is infinitely adjustable relative to the securing arrangement.

Various modifications can be made without departing from the scope of the invention. For example, the load spreading arrangement 18 could be any suitable shape other than those described above.

The invention claimed is:

1. A ground stabilising device comprising:
   a securing arrangement and a load spreading arrangement on the securing arrangement, the securing arrangement comprising a body defining a through passage through which an elongate article can extend, the body extending transverse to the load spreading arrangement;
   wherein the body comprises a guide member extending towards the through passage, the guide member comprising an internal wall of the body;
   wherein the securing arrangement further includes a clamping assembly movable along the guide member towards the through passage to clamp the elongate article in the passage and secure the elongate article to the ground stabilising device, the clamping assembly comprising a clamping member and urging means to urge the clamping member towards the through passage;
   wherein the body has distal and proximal end regions, the proximal end region being closer to the load spreading arrangement than the distal end region;
   wherein the securing arrangement further includes a reaction member to provide a reaction force to the urging means;
   characterised in that the reaction member being provided at said proximal end region of the body; and
   further characterised in that the urging means extends from the reaction member at said proximal end region of the body to the clamping member to urge the clamping member towards the distal end region of the body.

2. The ground stabilising device according to claim 1, wherein the clamping member comprises a cylindrical or spherical member or a wedge, and the urging means comprises a spring.

3. The ground stabilising device according to claim 1, wherein the guide member has a first end region at the passage, and a second end region spaced from the first end region, the urging means extending from the second end region towards the first end region.

4. The ground stabilising device according to claim 3, wherein the body defines a space in communication with the through passage, the guide member constituting a guide wall of the space.

5. The ground stabilising device according to any claim 4, wherein the body defines a release aperture, which extends through the body to the space to release the clamping member from clamping the elongate article.

6. The ground stabilising device according to claim 4, wherein the body comprises an article engaging wall along which the passage extends.

7. The ground stabilising device according to claim 6, wherein the clamping member is urged by the urging means towards the article engaging wall, whereby the clamping member can clamp the elongate article against the article engaging wall.

8. The ground stabilising device according to claim 1, wherein the guide member is inclined at an acute angle to the passage, said acute angle being between 10° and 30°.

9. The ground stabilising device according to claim 1, wherein the load spreading arrangement extends outwardly from the securing arrangement.

10. The ground stabilising device according to claim 1, wherein the load spreading arrangement comprises a plurality of outwardly extending elongate rib members, each elongate rib member having a distal end spaced from the securing arrangement.

11. The ground stabilising device according to claim 10, wherein the load spreading arrangement comprises a rim to join the distal ends of adjacent outwardly extending elongate rib members to each other, the rim extending substantially wholly around the securing arrangement.

12. The ground stabilising device according to claim 10, wherein the distal ends of the outwardly extending elongate rib members are free ends.

13. The ground stabilising device according to claim 10, wherein the load spreading arrangement includes a web covering, which extends between the elongate rib members.

14. The ground stabilising device according to claim 10, wherein the load spreading arrangement has a holding formation in which an end region of the elongate article can be held.

15. The ground stabilising device according to claim 14, wherein the holding formation extends outwardly from the securing arrangement.

16. The ground stabilising device according to claim 14, wherein the load spreading arrangement comprises a web covering, and the holding formation is defined in the web covering.

17. The ground stabilising device according to claim 16, wherein the holding formation is an elongate recess defined in the web covering.

18. The ground stabilising device according to claim 14, wherein the load spreading arrangement has two holding formations extending outwardly opposite each other from the securing arrangement.

19. The ground stabilising assembly comprising a ground stabilising device and an elongate article, wherein the ground stabilising device comprises:
    a securing arrangement and a load spreading arrangement on the securing arrangement, the securing arrangement comprising a body defining a through passage through which an elongate article can extend, the body extending transverse to the load spreading arrangement;
    wherein the body comprises a guide member extending towards the through passage, the guide member comprising an internal wall of the body;
    wherein the securing arrangement further includes a clamping assembly movable along the guide member towards the through passage to clamp the elongate article in the passage and secure the elongate article to the ground stabilising device, the clamping assembly comprising a clamping member and urging means to urge the clamping member towards the through passage;
    wherein the body has distal and proximal end regions, the proximal end region being closer to the load spreading arrangement than the distal end region;
    wherein the securing arrangement further includes a reaction member to provide a reaction force to the urging means;
    characterised in that the reaction member being provided at said proximal end region of the body; and
    further characterised in that the urging means extends from the reaction member at said proximal end region of the body to the clamping member to urge the clamping member towards the distal end region of the body.

20. The ground stabilising assembly according to claim 19, wherein the elongate article comprises a metal wire, wire rope or strand.

\* \* \* \* \*